(12) United States Patent
Begen et al.

(10) Patent No.: US 9,049,481 B2
(45) Date of Patent: Jun. 2, 2015

(54) FINE-TUNING THE TIME FOR LEAVING/JOINING A MULTICAST SESSION DURING CHANNEL CHANGES

(75) Inventors: Ali C. Begen, London (CA); William C. Ver Steeg, Alpharetta, GA (US); Toerless Eckert, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 439 days.

(21) Appl. No.: 13/115,727

(22) Filed: May 25, 2011

(65) Prior Publication Data

US 2012/0303760 A1    Nov. 29, 2012

(51) Int. Cl.
*H04L 12/18*   (2006.01)
*H04N 21/266*   (2011.01)
*H04L 29/06*   (2006.01)
*H04N 21/6405*   (2011.01)
*H04N 21/6408*   (2011.01)
*H04N 21/4402*   (2011.01)
*H04N 21/442*   (2011.01)
*H04N 21/00*   (2011.01)
*H04N 21/438*   (2011.01)

(52) U.S. Cl.
CPC .......... *H04N 21/4384* (2013.01); *H04L 12/185* (2013.01); *H04L 65/4076* (2013.01); *H04N 21/44209* (2013.01); *H04N 21/6405* (2013.01); *H04N 21/6408* (2013.01)

(58) Field of Classification Search
CPC ............ H04L 12/185; H04L 29/06027; H04L 65/4076; H04N 21/26616; H04N 21/00; H04N 21/4384; H04N 21/6405; H04N 21/6408
USPC .......... 709/205, 218, 219, 228, 231; 370/507; 725/86, 90, 97
See application file for complete search history.

(56) References Cited

U.S. PATENT DOCUMENTS

| 7,724,744 | B2 * | 5/2010 | Shur et al. ...................... 370/392 |
| 7,996,455 | B2 * | 8/2011 | Jackson ........................ 709/200 |
| 8,161,515 | B2 * | 4/2012 | Haimi-Cohen et al. ........ 725/90 |
| 2005/0081244 | A1 * | 4/2005 | Barrett et al. ................... 725/97 |
| 2009/0106792 | A1 * | 4/2009 | Kan et al. ........................ 725/34 |
| 2011/0219416 | A1 * | 9/2011 | Lindquist et al. ............. 725/110 |

\* cited by examiner

*Primary Examiner* — Un C Cho
*Assistant Examiner* — Peian Lou
(74) *Attorney, Agent, or Firm* — Merchant & Gould (57) ABSTRACT

In one embodiment, a method that receives at a client device a unicast content stream; receives from a network an indication of a future time corresponding to when to send a join message to acquire a multicast content stream; accesses historical information about transitions between unicast and multicast content streams; and sends a join message for the multicast content stream at a time corresponding to the indicated future time subject to a time offset determined by the client device, the time offset based on the historical information.

18 Claims, 7 Drawing Sheets

FINE-TUNING THE TIME FOR LEAVING/JOINING A MULTICAST SESSION DURING CHANNEL CHANGES

FIELD OF THE DISCLOSURE

The present disclosure relates to digital content delivery, and more specifically, to reducing delay in transitioning between digital content streams.

BACKGROUND

A growing number of consumers now have high-speed, or broadband, connections to the Internet in their homes. The increased bandwidth provided by these broadband connections allows the delivery of digital television, video, and multimedia services to customer premises (e.g., home consumers). These services are transported over a network as content streams. At the customer premises, a digital receiver decodes one or more content streams. The digital receiver also generates a video signal for display by a television or monitor. A switch to a different content stream results in a finite amount of delay before the new content stream can be decoded and displayed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Overview

In one embodiment, a method that receives at a client device a unicast content stream; receives from a network an indication of a future time corresponding to when to acquire a multicast content stream; accesses historical information about transitions between unicast and multicast content streams; and acquires the multicast content stream at a time corresponding to the indicated future time subject to a time offset determined by the client device, the time offset based on the historical information.

Example Embodiments

Disclosed herein are certain embodiments of stream transition systems and methods that reduce or eliminate the size of the overlap or gap between a unicast burst stream and a requested multicast stream. In one embodiment, a client device (e.g., digital receiver with decoding capability) keeps track of the gap/overlap from prior accelerated (or regular) channel change requests and modifies the signaled multicast join times based on previous (e.g., historical) results. For instance, an upstream device (e.g., server) may maintain a per-system (or per region, per server, etc.) state variable for a given group membership protocol (e.g., IGMP or MLD) average join delay. The network infrastructure in which a given client device is associated, on the other hand, may possess significantly different performance characteristics when compared to an average infrastructure, possibly resulting in faster or slower join delays. If the offset (from average) is fairly constant, then the average join time can be modified by the offset.

In some implementations, knowledge of the locality of a content stream source may enable improvements in stream transition performance. In one embodiment, a client device may "know" that the desired content stream is local to a network of the client device, and the join time may be significantly lower for this local content stream than for an average content stream (sourced from further upstream). Such an implementation may arise in a multi-room digital video recorder (DVR) system with a "master DVR" that possesses knowledge of the streams consumed by every client device in the premises. With a two-phase (e.g., high and low-bandwidth or bitrate) unicast burst stream, a join may be issued during a high-bandwidth phase, and if combined with a multicast content stream, may require consumption of more resources (e.g., CPU cycles) than are currently available on the client device. Accordingly, the client device may delay joining the multicast content stream until the second phase.

In another embodiment, the client device may be aware of time-of-day variations in the join time. For instance, at the top of the hour, join times may be significantly higher than during non-peak hours. The client device may adopt an offset to the join time (or in some embodiments, the server may have such knowledge and provide a suitable join time).

Though certain embodiments are described above in the context of normal multicast leave/join scenarios (non-accelerated channel changes), one or more embodiments may be employed in the context of acceleration requests (e.g., rapid channel changes) in lieu of or in addition to the join/delay embodiments described above. That is, in one embodiment, in addition to determining the time for sending a join message, a client device is configured to determine the time for sending an acceleration request (e.g., RAMS-R message in a RAMS solution as explained in http://tools.ietf.org/html/draft-ietf-avt-rapid-acquisition-for-rtp). For instance, if the acceleration request is sent immediately after a leave message, a channel change server may start bursting content at a high bitrate even before the existing multicast content stream is stopped, which if resulting in a congestion or resource utilization problem (or others), may offset the benefits of performing an accelerated channel change. By tracking the leave times in a current system, a client device may fine-tune the time it sends the acceleration request message.

Digressing briefly, in a multicast-based content delivery system (e.g., such as linear TV in IPTV), the client device (e.g., receiver) implements a group membership protocol such as IGMP or MLD to watch a television channel and switch between different channels. To transition from one channel to another, the client device sends a leave message for the multicast session for the existing channel and then a join message for the new multicast session. The join message should be sent quickly to start receiving the new multicast content sooner, yet the join message may not be sent immediately after the leave message to minimize the chances of overloading the access link of the client device. If the earlier multicast stream is not stopped before the new multicast stream starts, the link may become oversubscribed/congested, resulting in packet loss. Neither IGMP nor MLD is a reliable protocol, and hence, messages from the same host may get lost or re-ordered and, more importantly, leave and join messages may be processed by different hosts. Consequently, the join message may be acted upon before the earlier-issued leave message. Regardless of whether the client device performs a simple leave/join (e.g., non-accelerated channel change) or implements an acceleration method such as RAMS, among others, the respective timing of the join message (as well as the timing of the acceleration request and acceleration termination messages in case of RAMS) is pertinent to the channel change experience.

In a service group (e.g., all client devices behind a DSLAM or an access/aggregation router), depending on the load of the multicast-capable network elements, the leave and join times may vary over time (e.g., during 8:00 PM (peak time) versus 4:00 AM (non-peak)). The leave times are often upper-bounded since the first multicast-capable network element receiving the leave message may stop the stream to that client device immediately. On the other hand, the join times may also differ for each service group if the requested multicast stream is not readily available in the first hop and the join message needs to be conveyed upstream for further processing. The timing of the processing of the acceleration requests may also be load and/or time variant. Due in part to the varying nature of the join times, minimizing the channel change times is challenging. Certain embodiments of stream transition systems described herein address these and other challenges.

The stream transition systems and methods are described hereinafter in the context of an example computer network environment, with content embodied as video for the sake of facilitating an understanding of the disclosure. It should be appreciated that other content, in lieu of or in addition to video, is also considered within the scope of the embodiments. Further, certain embodiments of stream transition systems and methods are described below in the context of an environment that uses Real-time Transport Protocol (RTP) and RTP Control Protocol (RTCP). One having ordinary skill in the art should understand that other types of networks distributing multimedia (e.g., video, graphics, audio, and/or data, or otherwise referred to also herein individually or collectively as media content or simply, content) using the same, or different protocols, may also benefit from certain embodiments of stream transition systems and methods, and hence, are contemplated to be within the scope of the disclosure. It should be understood by one having ordinary skill in the art that, though specifics for one or more embodiments are disclosed herein, such specifics as described are not necessarily part of every embodiment.

Figure 1:
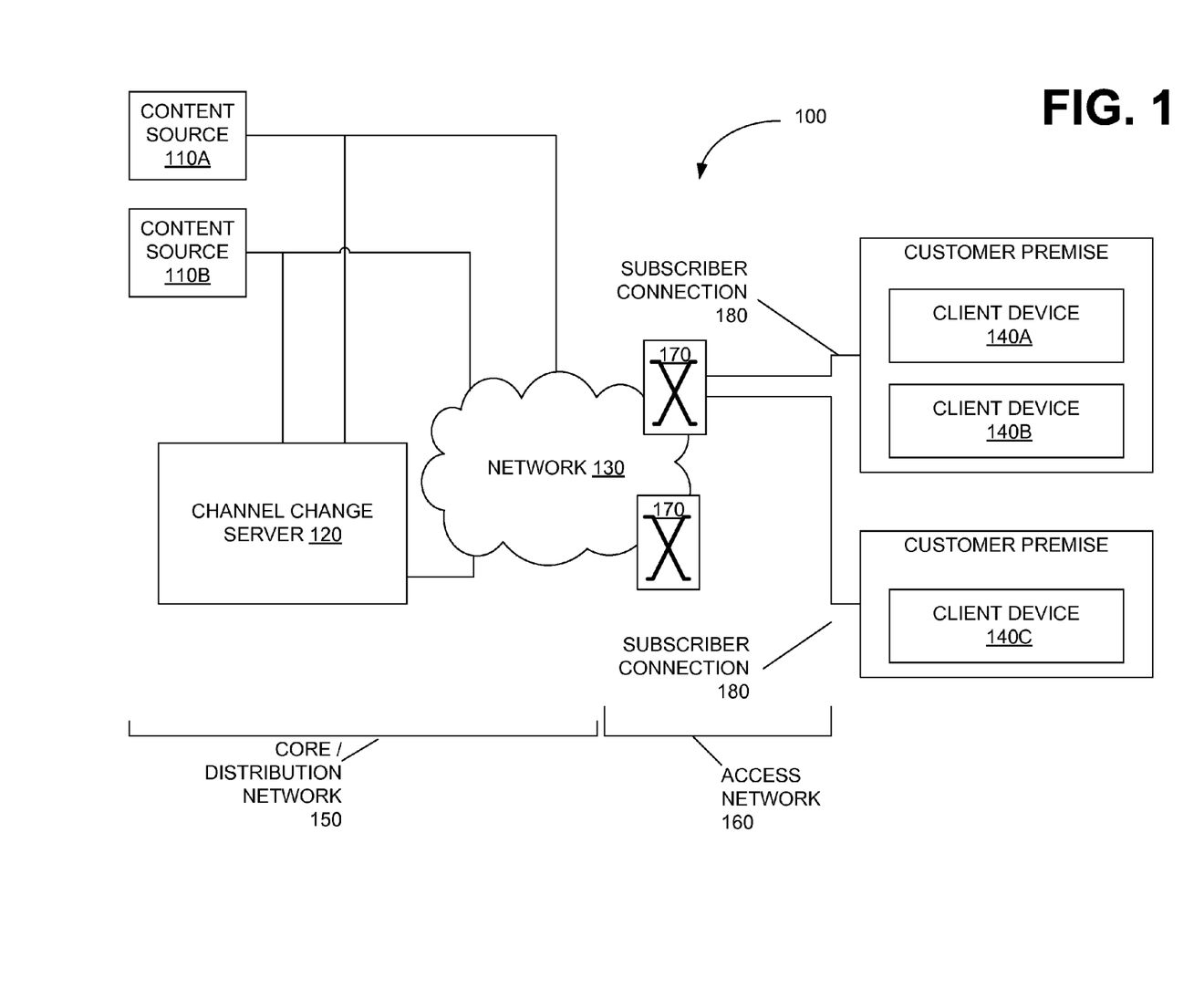
FIG. 1 is a block diagram of an example environment in which one embodiment of a stream transition system and method may be implemented.

FIG. 1 is a block diagram of an example environment in which one embodiment of a stream transition system is implemented. A computer network 100 delivers various digital services to subscribers, which may include television programming, video-on-demand, pay-per-view, music, Internet access, shopping, and telephone. These services are delivered using content streams, which may be provided from various sources. One such source includes content sources 110A and 110B, which encode content from a co-located or upstream service provider, such as a cable network or an on-air television station. The output of content sources 110A and 110B is also referred to herein as a linear content stream because the broadcast programming provided by content sources 110A and 110B plays out in a linear fashion. In contrast, an on-demand content stream allows portions of the program to be accessed at random in response to a user request. Linear streams produced by content sources 110A and 110B are captured and buffered for some period of time in a channel change server 120 (also may be referred to herein as a retransmission server) in order to provide accelerated channel change capabilities, as will be described below. Note that there may be other types of content sources 110A and 110B in addition to the encoders, as well as additional servers and/or other devices (e.g., routers).

Other sources of content streams should be familiar to a person of ordinary skill in the art, and are intended to be within the scope of this disclosure. Various content stream sources may be located at a facility known as a headend which is operated by a service provider (e.g., cable television company). However, these components are not limited to residing at that location. Common encoding formats for content streams include MPEG-2, MPEG-4, and VC-1, but others are contemplated to be within the scope of this disclosure. In some environments, the encoded content stream represents a single user program, and thus contains a video elementary stream and an audio elementary stream multiplexed together into a single program transport stream (SPTS).

Content streams are delivered over a network 130 to one or more client devices 140 (also, may be referred to herein as digital receivers or set-top boxes), such as client devices 140A, 140B, 140C. These client devices 140 may be located at customer premises, which include business and home consumers. In some embodiments where a plurality of client devices 140 reside in a single premise, such as client devices 140A and 140B, one of the client devices 140A may serve as a master (e.g., master DVR where digital video recording functionality resides in the client device), which in some embodiments enables a determination by the subordinate client device 140B of the locality of the stream source for purposes of determining an offset adjustment to indicated (e.g., indicated by the network) join times. Similarly, the master client device 140A may be aware of the locality of the subordinate client device 140B, and hence, make adjustments to average join times in view of such a locality. In some embodiments, both the master 140A and the subordinate 140B may cooperate in providing a suitable join time (e.g., that removes or mitigates gaps or overlap in received streams).

In the example environment of FIG. 1, the network 130 includes a core/distribution network 150 and an access network 160. Multiple content streams are combined and packetized into a content packet stream, in a form which is suitable for transport over the core network 150. A content packet stream, carrying multiple programs that are destined for many different subscribers, is transported over the core/distribution network 150, and delivered to various network elements 170 located at the network edge. Each element 170 selects, based on a particular subscriber's request, a subset of the programs carried in content packet stream, and produces a content stream which is delivered, via subscriber connections 180, to those subscribers connected to element 170. In some embodiments the delivered stream uses multicast addresses, while in other embodiments, unicast addresses are used.

The client device 140 receives, via subscriber connection 180, a content packet stream carrying the selected programs. The client device 140 converts the stream of content packets into an analog or digital video signal, which is supplied to a display (e.g., a television or computer monitor) for viewing by a customer. Some embodiments of the client device 140 also provide interactive features, such as an electronic program guide (EPG), Web browser, or DVR (digital video recorder) functionality. In some embodiments, the client device 140 takes the form of a set-top box or like-functionality embedded in another device. For instance, in some embodiments, the client device 140 may be implemented as a personal computer (PC). The term "client device" extends to other types of receivers that include the capability to receive and process compressed digital content (e.g., video, audio, etc.) streams. Examples of other types of client devices 140 include: hand-held and/or mobile receivers that are coupled to a transmission channel which carries content packet streams; video-services-enabled receivers (VSERs); and other electronic devices such as media players.

As explained earlier, a subset of program streams is selected by the network element 170 for delivery to a particular subscriber location. Each of these program streams can be viewed as being carried on a different logical channel. The client device 140 communicates with channel change server 120 to request the particular program streams, or logical channels, be included in the content packet stream received by the client device 140. For example, the client device 140, in response to a user request to watch Channel 12, requests an "accelerated channel change" from channel change server 120, with the target channel as Channel 12. Although the term "channel change" is used herein, this term is not limited to user requests. This term is also intended to cover requests that are not user-initiated (e.g., an automatic change to a logical channel at a specific time for recording or viewing). The term "channel" is not limited to a traditional television channel, but encompasses the bandwidth and selected frequency associated with providing a particular programming content instance (e.g., movie, episode, etc.) or other service.

Figure 2:
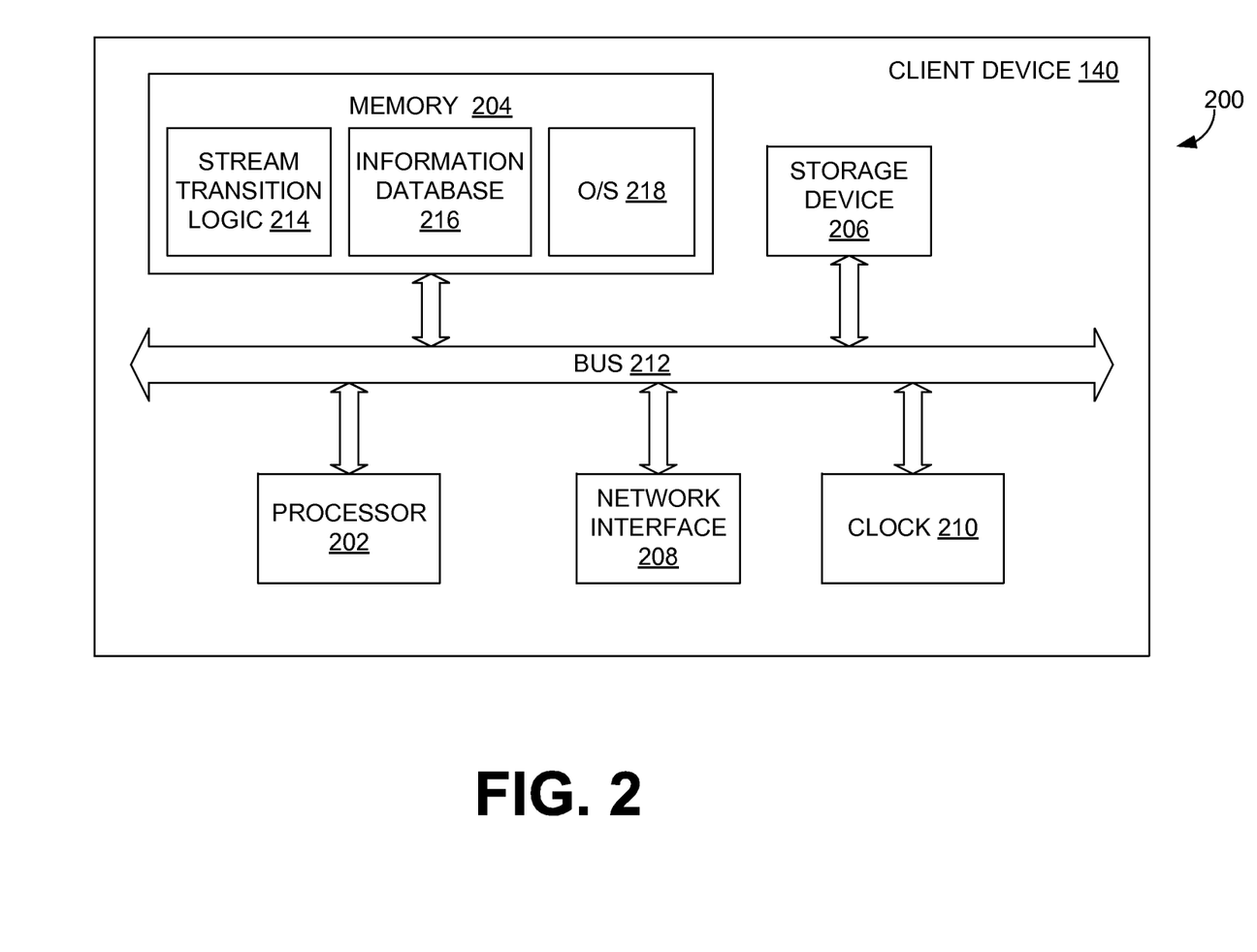
FIG. 2 is a block diagram of an example client device that comprises an embodiment of a stream transition system.

FIG. 2 is a block diagram of one embodiment of a client device 140. In one embodiment, the client device 140 also serves as the stream transition system 200. In some embodiments, a stream transition system may comprise a subset of the client device (e.g., the stream transition software), and in some embodiments, a stream transition system may comprise additional components in the network 100. The client device 140 contains a number of components that are well-known in the computer arts, including a processor 202, memory 204 (volatile memory and/or non-volatile memory), a storage device 206 (e.g., non-volatile memory, a magnetic-based disk drive, semiconductor-based storage, etc.), a network interface 208, a clock 210, and a bus 212 (or busses) coupling the aforementioned components. Omitted from FIG. 2 are a number of conventional components that are unnecessary to explain the operation of the stream transition system 200.

Stored in memory 204 are executable instructions that cause the processor 202 to perform stream transitioning according to certain embodiments. For instance, memory 204 comprises stream transition logic 214, information database 216, and an operating system (O/S) that controls information and execution flow in the client device 140. In some embodiments, the information database 216 may be stored in the storage device 206, or elsewhere in the network 100. The information database 216 comprises historical data associated with prior join delays, leave times (e.g., delays), peak and non-peak hour performance associated with join and/or leave times, and other information associated with past (e.g., recent) stream transition performance. Though described as a database, the information database 216 may be configured as other types of data structures in some embodiments. The stream transition logic 214 accesses the information database 216 to make a determination regarding adjustment of join times conveyed as an indication in an out-of-band stream and/or in-band stream from an upstream device, such as the channel change server 120, router, or other network device.

For instance, the channel change server 120 may signal a join time (e.g., an indication of a future time for the client to send a multicast join message to acquire the desired multicast content stream) during, or associated with, a given stream transition event. Such a join time may be based on a computed average, though other mechanisms or algorithms may be used to determine the join times. The stream transition logic 214 receives the join time from the channel change server 120 and accesses the historical join times listed in the information database 216. Responsively, the stream transition logic 214 makes a determination as to a suitable adjustment (e.g., offset) in the signaled join time to fine-tune the actual time to send the join message. Such a determination may be based on current computational resources of the client device (e.g., buffer status, processor load, etc.), bandwidth and/or congestion in the network (e.g., access network 160), and the availability (e.g., latency in receiving) information necessary to decode the desired content stream. By providing the offset, the client device 140 may reduce or eliminate any gap between an old content stream from which the client device is transitioning to a new stream (e.g., unicast stream) corresponding to a desired channel change.

In some embodiments, the stream transition logic 214 may also use the historical data of the information database 140 to determine a time for sending an acceleration request (RAMS-R). For instance, the information database 140 may track leave times and store the same, and use that stored information to determine a suitable time to issue a RAMS-R (e.g., suitable in that the overlap or gap between burst data and an old stream from which the client device is leaving is eliminated or reduced).

In some embodiments, the stream transition logic 214 may store peak and non-peak, day-to-day data on join times and, based on an internal clock 210 or network information, adjust the delivered (average) join time with an offset based on knowledge of this historical data. Similar processing may be employed for determining a suitable time to issue a RAMS-R request.

In some embodiments, the stream transition logic 214, aware of the locality of a stream source, may adjust the join time (or RAMS-R request time) to account for the locality of the stream source. For instance, and as mentioned previously, if the unicast content stream that facilitates the transitioning between two channels is provided in high and then low-bandwidth (e.g., bitrate) phases, a join time may be delayed until the lower bandwidth phase is delivered.

In some embodiments, functionality of the stream transition logic 214 may be implemented in hardware, or as illustrated in FIG. 2, the stream transition logic 214 may reside in memory 204 as instructions which, when executed by the processor 202 under the auspices of the operating system 218, implement the systems and methods of the stream transition system 200. Hardware implementations include, but are not limited to, a programmable logic device (PLD), programmable gate array (PGA), field programmable gate array (FPGA), an application-specific integrated circuit (ASIC), a system on chip (SoC), and a system in package (SiP). Furthermore, functionality of the stream transition logic 214 may be implemented as a combination of hardware logic and processor-executable instructions (software logic).

The stream transition logic 214 may be embodied in any computer-readable medium for use by or in connection with any apparatus or device which includes a processor, or any system which can fetch and execute instructions. In the context of this disclosure, a "computer-readable medium" can be any means that can contain or store the instructions for use by the processor. The computer readable medium can be (for example, but not limited to) a system or that is based on electronic, magnetic, optical, electromagnetic, or semiconductor technology.

The software components illustrated herein are abstractions chosen to illustrate how functionality is partitioned among components in some embodiments of the stream transition system 200 disclosed herein. Other divisions of functionality are also possible, and these other possibilities are intended to be within the scope of this disclosure. Furthermore, to the extent that software components are described in terms of specific data structures (e.g., databases, arrays, lists, flags, pointers, collections, etc.), other data structures providing similar functionality can be used instead.

Software components are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform. Software components referred to herein include executable code that is packaged, for example, as a standalone executable file, a library, a shared library, a loadable module, a driver, or an assembly, as well as interpreted code that is packaged, for example, as a class.

Figure 3:
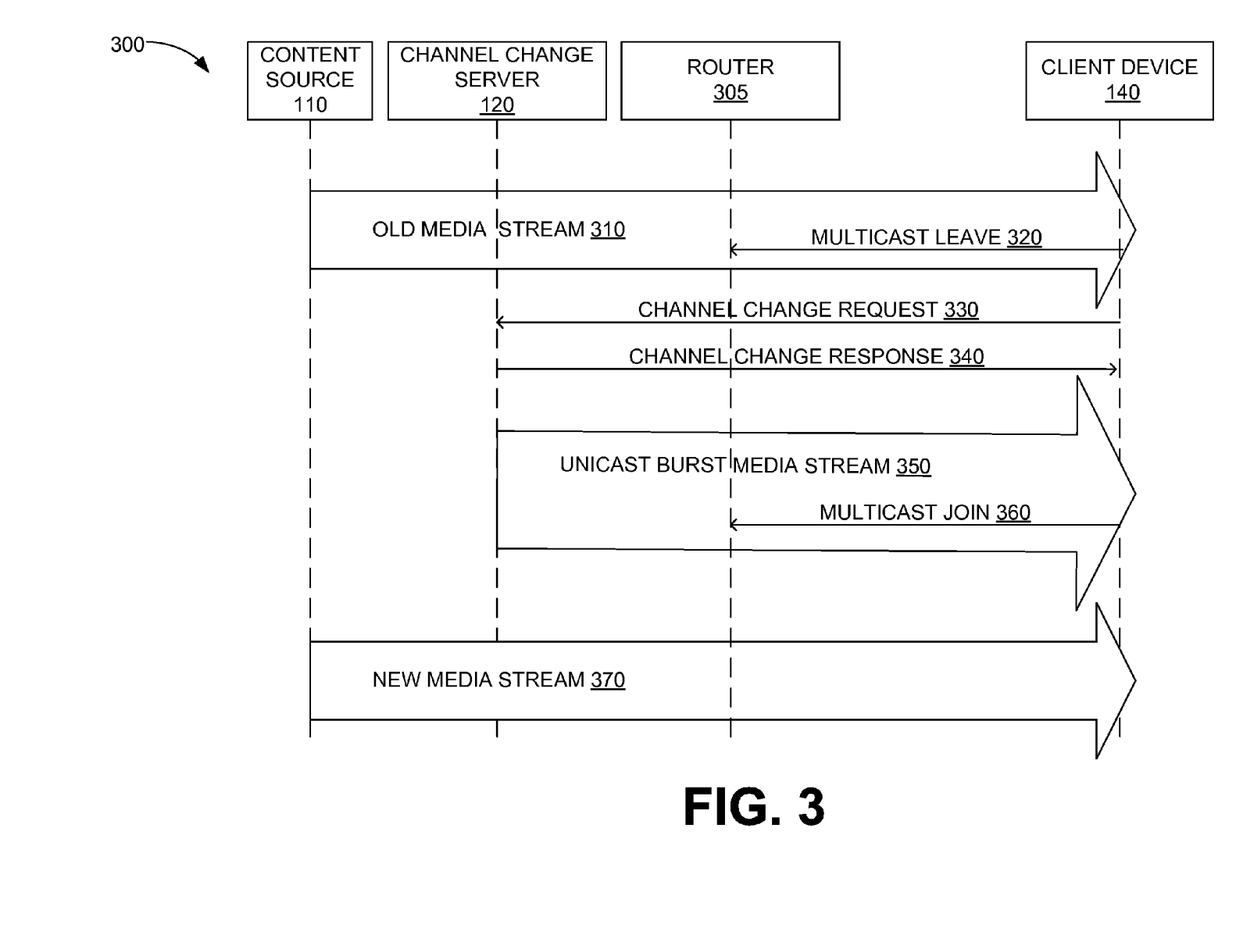
FIG. 3 is a message sequence diagram illustrating the exchange of information between some components during a channel change involving a stream transition system.

A channel change (or other stream transition event) causes the client device 140 to begin decoding a different stream. As a result, some amount of delay is incurred before the content of the new stream can be decoded and displayed. Several factors may contribute to this delay, including the delay attributed to receiving information necessary to process a desired multicast stream, the periodicity and extent of contiguity of such information, buffer conditions at the client device 140 (e.g., to address network conditions such as the potential for jitter, enable re-transmission, as well as to address application-specific decoding, such as compressed picture buffer fill, time stamp receipt, etc.), processing load on the devices, and timing of the join request relative to one or more of these factors. FIG. 3 is a message sequence diagram illustrating the exchange of information between some components during a channel change. In some types of networks (e.g., IP networks), changing a channel involves the client device 140 joining and leaving particular multicast sessions, each of which carries a set of logical channels. Because this multicast procedure takes some time to complete, some channel change servers provide the requesting client device 140 with a unicast stream while waiting for the multicast procedure to complete and the new multicast stream to be delivered to the client device 140. This use of unicast streams to speed up a channel change is sometimes referred to as "fast channel change" or "instant channel change" or "rapid acquisition of multicast sessions". In some implementations, the unicast stream is delivered in two phases, one phase comprising a first bitrate (high-bandwidth phase) followed by a second, lower bitrate (low-bandwidth phase).

At the start of sequence 300, the client device 140 is receiving the content stream 310 (the old media stream) from content source 110. While still receiving the content stream 310, the client device 140 sends a message 320 to the upstream router 305 (or a network element that can process the leave message) to remove itself from the old multicast session (e.g., a multicast leave). The client device 140 then sends a request 330 to the channel change server 120 for a new channel, and channel change server 120 sends back a response 340. The content source 110 eventually provides a new multicast stream carrying the requested channel, but until that happens, the channel change server 120 sends a unicast burst media stream 350 carrying the requested channel. This unicast burst stream 350 (also referred to herein as a unicast content stream) is a recently cached version of the requested media stream and starts with a random access point (RAP) in the stream to minimize the time it takes for the decoder to start decoding the stream. In some embodiments, the RAP is an I-frame.

While the unicast burst stream 350 is being transmitted, the client device 140 sends a message 360 to the upstream router 305 (or a network element that can process the join message) adding itself to the new multicast session (e.g., a multicast join). Certain methods of sending the join message, and in particular, the timing of the join message, are described further below. At some point after this message is issued and while still receiving unicast burst stream 350, the client device 140 starts receiving the new channel on another multicast stream 370 sent from content source 110. The timing or fine-tuning of the join message relative to the leave message (or applying similar principles, the timing of a RAMS-R request relative to the leave message in an accelerated channel change scenario) impacts the amount of, or existence thereof, overlap or gap between the newly requested multicast stream and the unicast stream. If there is an overlap, during the overlap period, the client device 140 merges the unicast burst stream 350 and the new multicast stream 370, discarding duplicate data as necessary. In some implementations, the second phase of the burst (low-bitrate phase) kicks in at a time proximal to the merge, or potential merge, of the unicast content stream and the new multicast stream, since the first phase (high-bitrate phase) is used to catch-up with the new multicast stream and the second phase facilitates the transition. When the unicast burst stream 350 has finished, the client device 140 receives only the new multicast stream 370. In some embodiments, the client device 140 notifies channel change server 120 that channel change operation has been completed and the new multicast stream 370 is being received.

Figure 4:
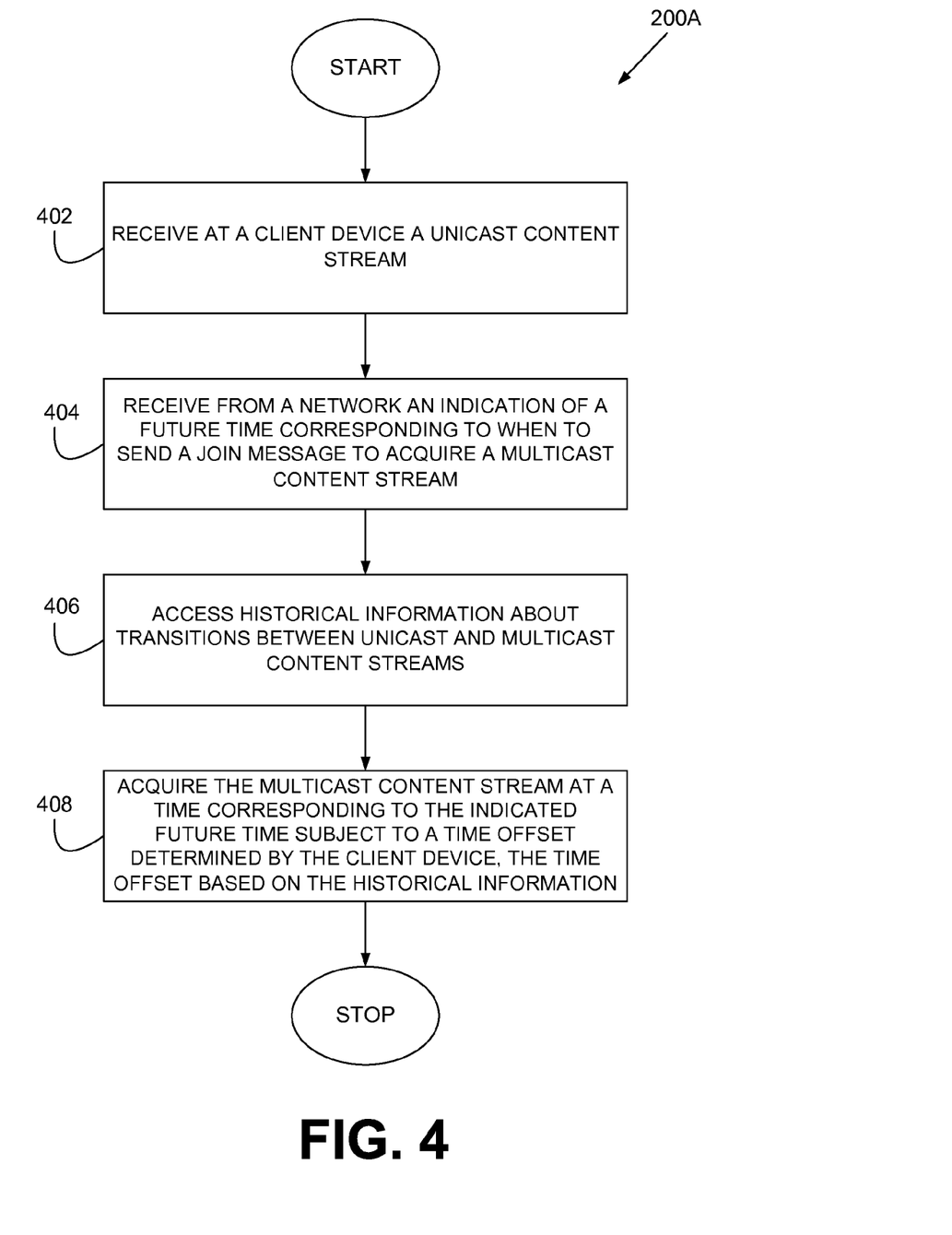
FIGS. 4-7 are flow diagrams that illustrate certain stream transition method embodiments.

Having illustrated an example stream transition event, attention is directed to the flow diagram of FIG. 4, which depicts an embodiment of an example method, denoted as method 200A, and implemented by the client device 140 (e.g., using the stream transition logic 214 in association with the information database 216). The method 200A comprises receiving at a client device a unicast content stream (402); receiving from a network an indication of a future time corresponding to when to send a join message to acquire a multicast content stream (404) (e.g., join time, such as an average join time provided by the channel change server 120); accessing historical information about transitions between unicast and multicast content streams (406); and acquiring the multicast content stream at a time corresponding to the indicated future time subject to a time offset determined by the client device, the time offset based on the historical information (408).

Figure 5:
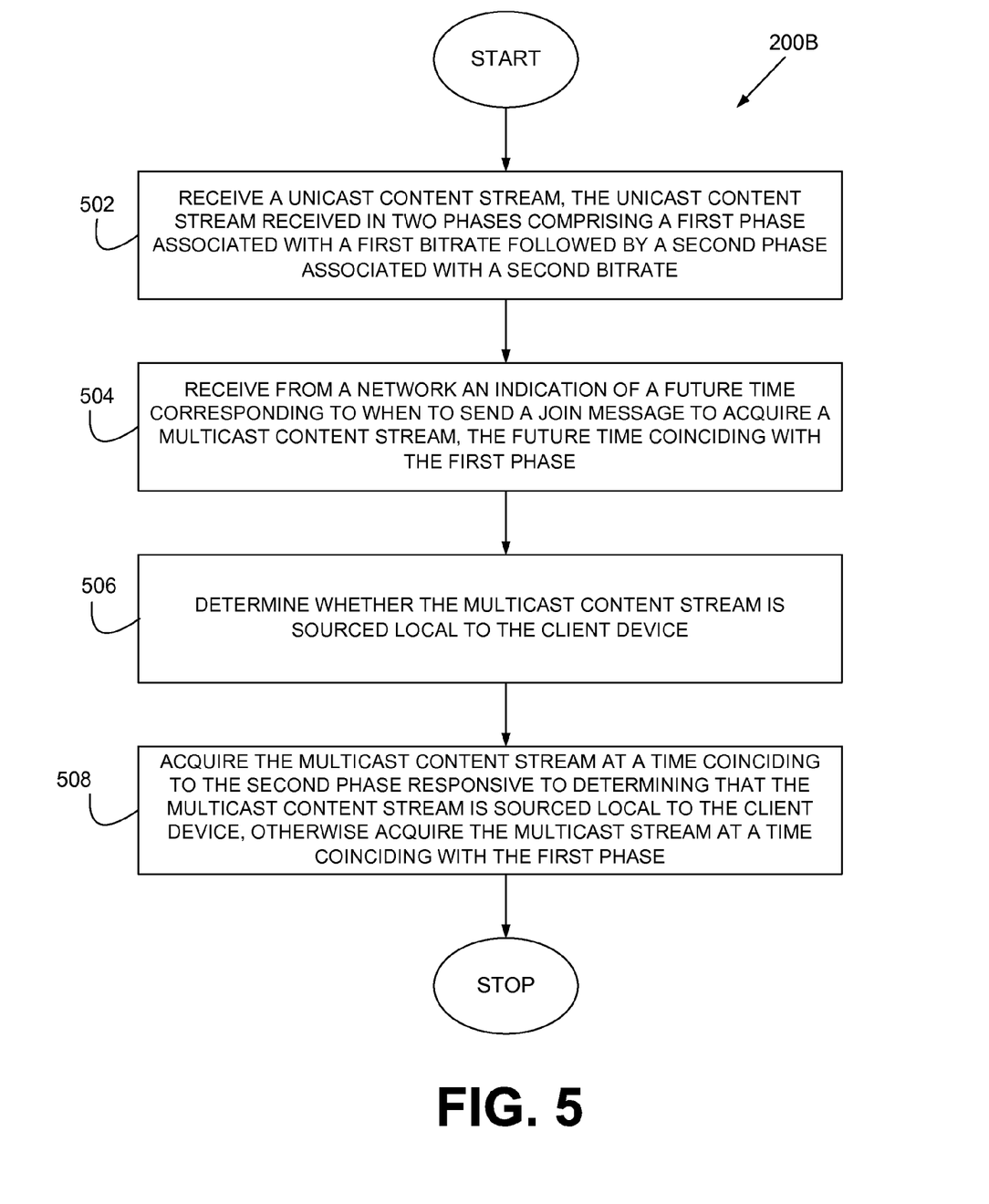

Another method embodiment employed by the client device 140 is depicted in FIG. 5 and denoted as method 200B, and comprises receiving a unicast content stream, the unicast content stream received in two phases comprising a first phase associated with a first bitrate followed by a second phase associated with a second bitrate (502); receiving from a network an indication of a future time corresponding to when to send a join message to acquire a multicast content stream, the future time coinciding with the first phase (504); determining whether the multicast content stream is sourced local to the client device (506); and acquiring the multicast content stream at a time coinciding to the second phase responsive to determining that the multicast content stream is sourced local to the client device, otherwise acquire the multicast stream at a time coinciding with the first phase (508).

Figure 6:
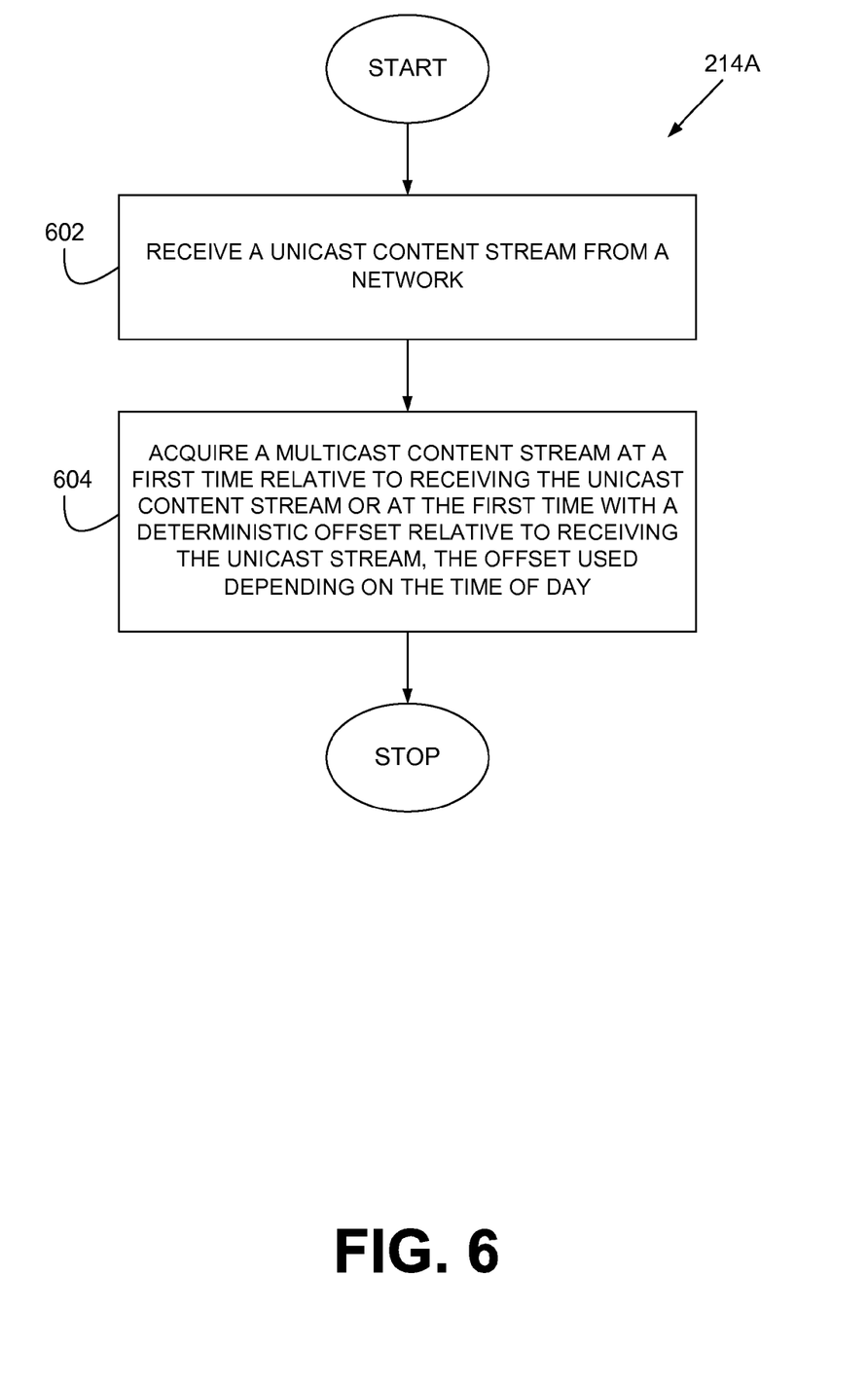

Another method embodiment employed by the stream transition logic 214, as stored on a computer readable medium and executable by a processor, is depicted in FIG. 6 and denoted as method 214A, and comprises receiving a unicast content stream from a network (602); and acquiring a multicast content stream at a first time relative to receiving the unicast content stream or at the first time with a deterministic offset relative to receiving the unicast stream, the offset used depending on the time of day (604).

Figure 7:
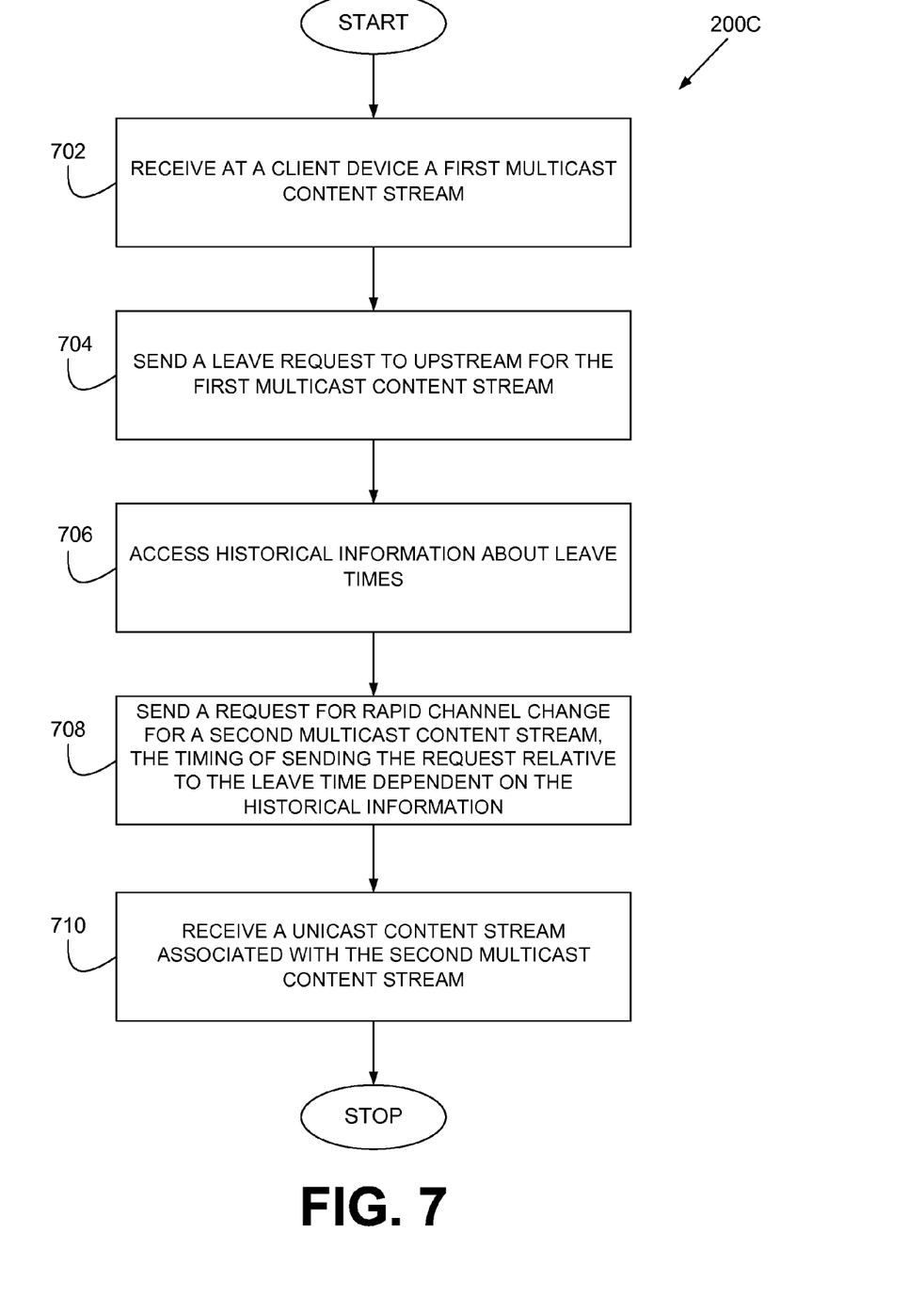

Another method embodiment employed by the client device 140 is depicted in FIG. 7 and denoted as method 200C, and relates to RAMS-R timing. In particular, the method 200C comprises receiving at a client device a first multicast content stream (702); sending a leave request to upstream network for the first multicast content stream (704); accessing historical information about leave times (706); sending a request for rapid channel change for a second multicast content stream, the timing of sending the request relative to the leave time dependent on the historical information (708); and receiving a unicast content stream associated with the second multicast content stream (710).

The flow diagrams and messaging diagrams herein provide examples of the operation of stream transition systems and methods. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method, comprising:
   receiving at a client device a unicast content stream;
   receiving from a network an indication of a future time corresponding to when to send a join message to acquire a multicast content stream;
   accessing historical information about transitions between unicast and multicast content streams; and
   acquiring the multicast content stream at a time corresponding to the indicated future time subject to a time offset determined by the client device, the time offset based on the historical information, the historical information comprising information associated with prior join delays, leave times, peak and non-peak hour performance associated with join and/or leave times, and past stream transition performance, the time offset further based on current computational resources of the client device, congestion in the network, and the availability of information necessary to decode the multicast content stream, and wherein the time offset either subtracts from or adds to a join time signaled via the indication.

2. The method of claim 1, wherein the unicast content stream comprises content associated with the multicast content stream.

3. The method of claim 1, wherein acquiring comprises the client device sending a join message to the network according to a group management protocol.

4. The method of claim 1, wherein the indication corresponds to an average join time.

5. The method of claim 1, wherein the historical information comprises past join times associated with at least one of: the client device and the multicast content stream.

6. The method of claim 1, wherein accessing comprises accessing a data structure residing in either memory or a storage device of the client device.

7. A client device, comprising:
   a memory comprising executable instructions; and
   a processor configured to execute the instructions to:
   receive a unicast content stream, the unicast content stream received in two phases comprising a first phase associated with a first bitrate followed by a second phase associated with a second bitrate;
   receive from a network an indication of a future time corresponding to when to send a join message to acquire a multicast content stream, the future time coinciding with the first phase, wherein the indication corresponds to an average join time;
   determine whether the multicast content stream is sourced local to the client device; and
   acquire the multicast content stream at a time coinciding to the second phase subject to a time offset determined by the client device, the time offset based on the historical information, the historical information comprising information associated with prior join delays, leave times, peak and non-peak hour performance associated with join and/or leave times, and past stream transition performance, the time offset further based on current computational resources of the client device, congestion in the network, and the availability of information necessary to decode the multicast content stream responsive to determining that the multicast content stream is sourced local to the client device, otherwise acquire the multicast stream at a time coinciding with the first phase.

8. The client device of claim 7, wherein the multicast content stream is sourced from a master client device residing at the same customer premise as the client device.

9. The client device of claim 7, wherein the unicast content stream comprises content associated with the multicast content stream.

10. The client device of claim 7, wherein the processor is configured to execute the instructions to acquire by sending a join message to the network according to a group management protocol.

11. A non-transitory computer readable storage medium encoded with computer executable instructions, and when executed, operable to cause a processor to:
    receive a unicast content stream from a network;
    receive an indication of a future time corresponding to when to send a join message to acquire a multicast content stream; and
    acquire the multicast content stream at the future time relative to receiving the unicast content stream or at the future time with a deterministic offset relative to receiving the unicast stream, the offset used depending on the time of day, the offset based on historical information associated with prior join delays, leave times, peak and non-peak hour performance associated with join and/or leave times, and past stream transition performance, the offset further based on information comprising current computational resources of the client device, congestion in the network, and the availability of information necessary to decode the multicast content stream.

12. The non-transitory computer readable storage medium of claim 11, wherein the acquisition is at the future time for non-peak hours of the day and at a sum of a first time and the offset for peak hours of the day.

13. The non-transitory computer readable storage medium of claim 11, wherein the unicast content stream comprises content associated with the multicast content stream.

14. The non-transitory computer readable storage medium of claim 11, wherein the acquisition comprises sending a join message to the network according to a group management protocol.

15. A method, comprising:
receiving at a client device a first multicast content stream;
sending a leave request to a network for the first multicast content stream;
accessing historical information about user leave request times;
sending a request for rapid channel change for a second multicast content stream, the timing of sending the request relative to a leave time dependent on the historical information;
receiving a unicast content stream associated with the second multicast content stream; and
receiving from a network an indication of a future time corresponding to when to send a join message to acquire the second multicast content stream subject to a deterministic time offset based on historical information associated with prior join delays, leave times, peak and non-peak hour performance associated with join and/or leave times, and past stream transition performance, the time offset further based on information comprising current computational resources of the client device, congestion in the network, and the availability of information necessary to decode the multicast content stream wherein the time offset either subtracts from or adds to a join time signaled via the indication.

16. The method of claim 15, further comprising accessing the historical information about transitions between unicast and multicast content streams.

17. The method of claim 15, further comprising sending a join message for the second multicast content stream at a time corresponding to the indicated future time subject to a time offset determined by the client device, the time offset based on the historical information.

18. The method of claim 15, further comprising sending a termination message for the unicast content stream at a time corresponding to the indicated future time subject to a time offset determined by the client device, the time offset based on the historical information.

* * * * *